United States Patent [19]
Buffet

[11] Patent Number: 5,349,392
[45] Date of Patent: Sep. 20, 1994

[54] FILTER MOUNTING FRAMES FOR EYEGLASSES

[76] Inventor: Alain Buffet, 81 rue Gabriel Péri, F 54110 Varangeville, France

[21] Appl. No.: 73,420

[22] Filed: Jun. 9, 1993

[30] Foreign Application Priority Data

Jun. 12, 1992 [FR] France .................. 92 07314

[51] Int. Cl.⁵ .................. G02C 7/10; G02C 9/02
[52] U.S. Cl. .................. 351/45; 351/47; 351/48; 351/57; 351/158; 2/13
[58] Field of Search .................. 351/41, 44, 45, 47, 351/48, 57, 58, 59, 83, 84, 85, 86, 90, 158; 2/13

[56] References Cited

U.S. PATENT DOCUMENTS

| | | | |
|---|---|---|---|
| 505,650 | 9/1893 | Francis | 351/59 |
| 624,445 | 5/1899 | Bennum | 351/58 |
| 868,857 | 10/1907 | Garner | 351/59 X |
| 1,181,291 | 5/1916 | Clarke | 351/47 |
| 1,386,989 | 8/1921 | Capper | 351/47 X |
| 1,596,810 | 8/1926 | Cooney | 351/48 |
| 1,647,626 | 11/1927 | Hopson | 351/47 X |
| 1,735,021 | 11/1929 | Stewart | 361/84 |
| 3,958,867 | 5/1976 | Morgan | 351/47 |
| 4,511,226 | 4/1985 | Freeman | 351/57 |

FOREIGN PATENT DOCUMENTS

| | | |
|---|---|---|
| 738533 | 12/1932 | France . |
| 2079635 | 11/1971 | France . |
| 2341147 | 9/1977 | France . |
| 2469734 | 5/1981 | France . |
| 373855 | 6/1931 | United Kingdom . |

*Primary Examiner*—William L. Sikes
*Assistant Examiner*—David R. Parsons
*Attorney, Agent, or Firm*—Cushman, Darby & Cushman

[57] ABSTRACT

In a pair of eyeglasses with filter lenses, each filter is mounted in a ring shaped in the form of a prone U whose opening is directed toward the center of the ring. The ring is contained within an outer ring connected to the eyeglasses mounting frame. A manipulating device comprising a molded member is located inside the ring in a recess formed in the periphery of the filter lens. The outer ring has a semicircular slot permitting the angular displacement of a positioning rod, which is integral with a piston slidably mounted in a recess against the action of a spring. One end of the rod is integral with a gripping member, while the other end is engageable in one of the positioning openings formed through one limb of the shaped outer ring.

6 Claims, 1 Drawing Sheet

FILTER MOUNTING FRAMES FOR EYEGLASSES

BACKGROUND OF THE INVENTION

The present invention relates to eyeglasses, and more particularly to a mounting frame for eyeglass filter lenses whose filtering properties are distributed asymmetrically over their surface. The mounting frame comprises manipulating means for angularly orienting each filter lens in a mounting seat.

One type of mounting frame for eyeglasses has already been proposed in which the filter lenses can be oriented in accordance with the field of view to be obscured. Eyeglasses with orientable filter lenses having filtering properties distributed asymmetrically over their surface are intended particularly for car drivers to protect them from being dazzled by the sun during the day and the headlights of vehicles moving in the opposite direction at night. Such mounting frames are described in FR A 2 341 147. The disadvantage of the proposal in this document stems from the complexity of the device which results in an expensive article of little aesthetic value.

The object of the present invention is to overcome, at least in part, the above mentioned disadvantages.

SUMMARY OF THE INVENTION

Accordingly, the present invention provides a mounting frame for eyeglass filters whose filtering properties are distributed asymmetrically over their surface, comprising a pair of mounting seats, each comprising a pair of nested annular elements having an inwardly directed channel-shaped cross section, a filter lens mounted in an inner said annular element of each said mounting seat, manipulating means for angularly orienting each lens in its associated mounting seat, each said manipulating means comprising a slidable detent member extending transversely through the inner annular element and engageable in locating holes formed in the associated outer annular element, biasing means for resiliently urging said detent member into engagement with said locating holes, and gripping means protruding through a slot in the wall of the outer annular member to permit manual disengagement of said detent member against the action of said biasing means.

Preferably, each mounting seat comprises two annular elements, shaped in the form of a prone U whose opening is directed toward the center of said nested annular elements, the annular space of the inner nested annular element receiving a filter lens and carrying the manipulating means which has a gripping member integral with one end of a rod extending perpendicularly to the plane of the annular elements. The resilient means comprises a spring urging the other end of the rod against the internal face of one of the parallel limbs of the portion of the external annular element which has the positioning openings for locating the end of the rod.

BRIEF DESCRIPTION OF THE DRAWINGS

The attached drawing illustrates, schematically and by way of example, one embodiment of the mounting frame for eyeglass filters in accordance with the invention.

DESCRIPTION OF THE PREFERRED EMBODIMENTS

Figure 3:
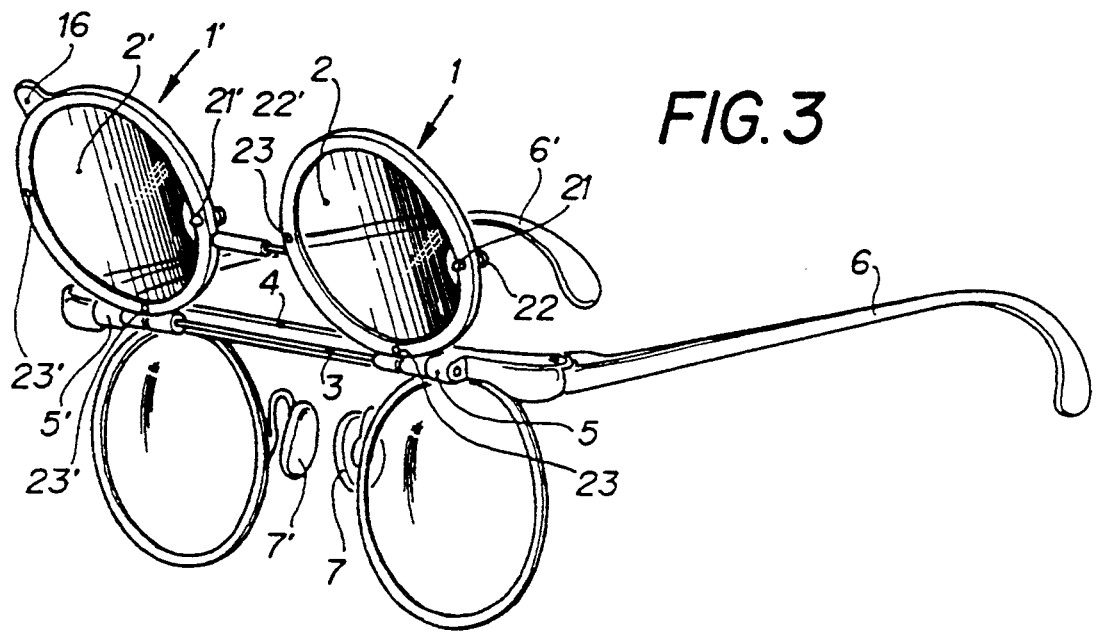
FIG. 3 is a perspective view of the mounting frame with the filters raised.
Figure 1:
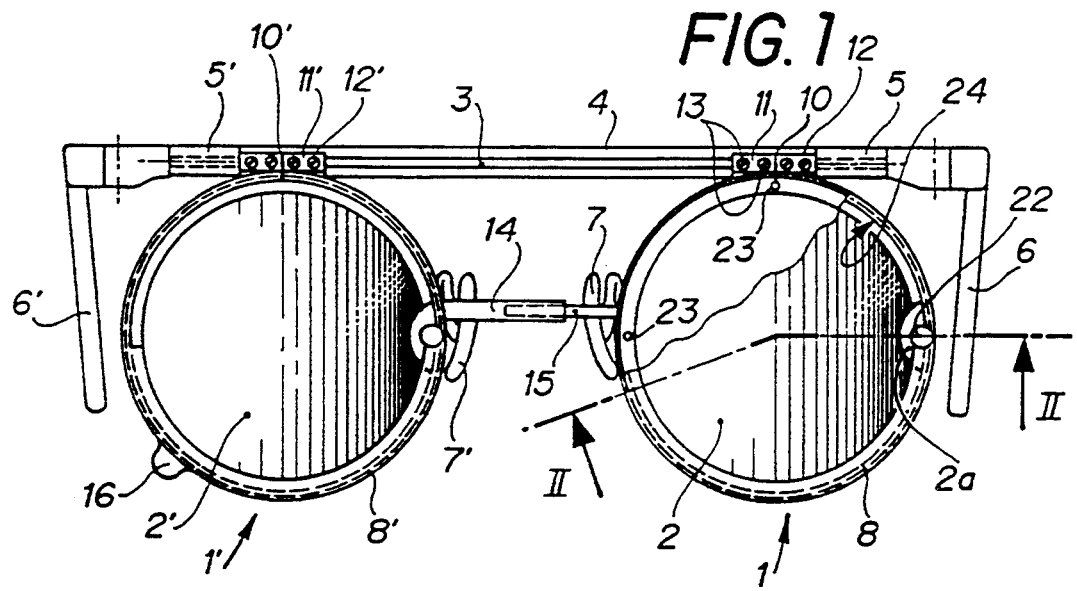
FIG. 1 is a front elevation of the mounting frame for eyeglass filters.

The mounting frame for eyeglass filters according to the invention comprises two annular mounting seats 1, 1' for two filter lenses 2, 2' attached to a common rod 3 connected to the rest of the mounting frame 4 by two hinges 5, 5'. The mounting frame further comprises two arms 6, 6' and two pads 7, 7' for resting on the sides of the nose. As shown in FIG. 1, the filter lenses 2, 2' are completely transparent over one-half of their circular surface bounded by a line extending substantially diametrically, while the other half displays filtering properties for light rays, preferably filtering properties exhibiting a gradient from the center towards the periphery where the degree of filtration is more pronounced. Of course, tinted lenses can also be employed so that the transparent half of the lens can be lightly tinted, the other half having more pronounced filtering properties.

Each annular mounting seat 1, 1' comprises two nested rings 8, 9 (FIG. 2) having a prone U-shaped section whose opening is directed to the center of the annular seat, contained one within the other. The outer ring 8 is split at 10 such that the two ends of the split can be elastically drawn apart to permit the introduction of the inner ring 9 which is contained in its annular opening. Each end of the outer ring 8 adjacent to the split 10 is integral with the sleeve 11, 12. The two sleeves are tangential to the outer ring 8 so that they are coaxial when the ends of the split are reunited, which permits them to be fitted onto the rod 3 to which they are fixed by screws 13.

The ring 8' includes a tube 14 attached radially along an axis parallel to the rod 3. The ring 8 carries a piston fixed radially coaxially to the tube 14 in which it is engaged. Thus, the two annular mounting seats 1, 1' are integral and able to articulate about hinges 5, 5'. A tongue 16 is fixed to one of the outer rings 8' to permit rotation of the annular seats about the hinges 5, 5'.

Figure 2:
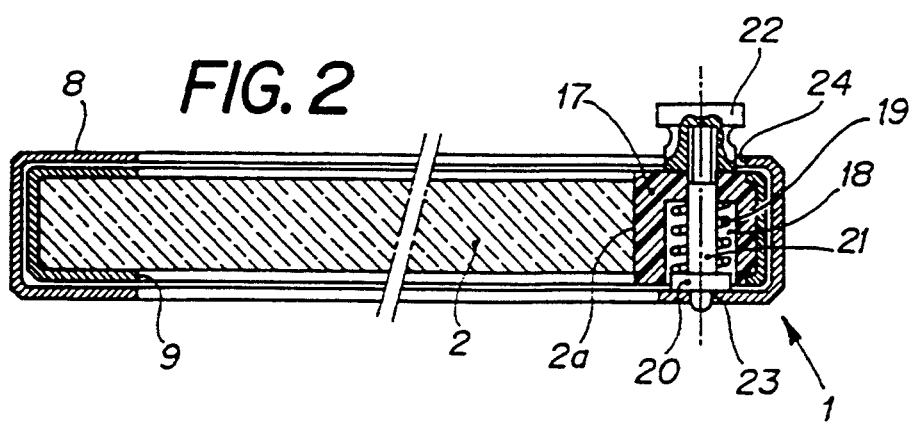
FIG. 2 is a partial sectional view taken along line II—II of FIG. 1.

As illustrated in FIG. 2, the filter lens is mounted in the annular opening of the inner ring 9. The lens 2 has a cut-out 2a formed in its periphery (FIG. 1 and 2), in which is mounted an actuator device comprising a molded member 17 having a shape complementary to that of the cut-out 2a. This molded member 17 is engaged in the annular opening of the inner ring 9. A cylindrical recess 18 is formed in one of the plane faces of this molded member 17 and the base of this recess is open. A spring 19 and a piston 20 integral with a rod 21 are located in this recess 18. One end of the rod 21 passes through the opening in the base of the recess 18. This end is threaded and a gripping member 22 is screwed onto it. The other end of the rod is engaged in one of the positioning holes 23 formed through one of the parallel limbs of the outer profiled ring 8. A slot 24 extending over half of the circumference of the ring 8 is formed in the other of the parallel limbs of the outer profile ring 8, opposite the part having positioning holes 23. This slot 24 permits the angular displacement of the rod 21 and the gripping member 22 when the end of rod 21 is disengaged from the positioning opening 23 by pulling axially on the rod with the aid of the gripping member 22 against the pressure that the spring 19 exerts on the piston 20. By displacing the gripping member 22 angularly after disengaging the rod 21 from the positioning opening 23, the ring 9 is displaced angularly in the ring 8 and consequently so is the lens 2 which, by means of its cut-out 2a, is angularly fixed relative to the molded member 17 and the rod 21. This permits the displacement of the filtering zone of the lens 2. The same operation can orient angularly the filtering zone of the lens 2 which is supplied with the same manipulating means as those illustrated in FIG. 2.

In the example illustrated, three positions 90° apart are provided. In particular, this permits the filtering zones to be located to the left of the visual axis of the user to avoid being dazzled from the left of his field of view. This is particularly useful for drivers traveling in countries that drive on the right of the road relative to the forward direction of vehicles. By displacing the lens 2, 2' 90° relative to the previous position counterclockwise, referring to FIG. 1, a filtering zone can be brought into the upper part of the field of view of the user, which provides protection against sun rays. Finally, the third position is intended in particular to protect against dazzling from the right of the field of view, and is particularly useful for drivers traveling in countries where vehicles move on the left of the road relative to the forward direction.

The lenses are preferably mounted on mounting frame 4 by a system of hinges 5, 5' and are made integral about the pivot axis of these hinges by means of piston 15 engaged in tube 14. By grabbing the tongue 16, it is thus possible to lift up the annular mounting seats 1, 1' into the position shown in FIG. 1. This is useful particularly if filters are mounted on a pair of eyeglasses provided with optical correction lenses, such that the filters can be removed from the field of view when the user does not require them.

It is further pointed out that the mounting of the annular mountings 1, 1' on the rod 3 through the intermediary of sleeves 11, 12, 11', 12' and their fixing on the screws 13 permits the changing at will of the separation of the lenses 2, 2' and consequently the pupillary separation by gliding the annular mountings 1, 1' on the rod 3. In this case, the piston 15 of the mounting 1 also slides in the tube 14 of the mounting 1'.

We claim:

1. A mounting frame for eyeglass filters whose filtering properties are distributed asymmetrically over their surface, comprising:
   a) a pair of mounting seats, each comprising a pair of nested annular elements having a channel-shaped cross section;
   b) a filter lens mounted in an inner one of said pair of nested annular elements of each said mounting seat:
   c) manipulating means for angularly orienting each lens in its associated mounting seat, each said manipulating means comprising:
      (i) a slidable detent member extending transversely through the inner annular element and engageable in locating holes formed in the associated outer annular element;
      (ii) biasing means for resiliently urging said detent member into engagement with said locating holes; and
      (iii) gripping means protruding through a slot in the wall of the outer annular member to permit manual disengagement of said detent member against the action of said biasing means;
   wherein an outer one of said pair of annular nested elements of each mounting seat is split to permit the separation of its two ends for insertion of the inner annular nested element, each of the ends of the split outer annular nested element being attached by a connecting element to a support member.

2. A mounting frame as claimed in claim 1, wherein said support member is connected to the rest of the mounting frame by articulation means permitting the displacement of the mounting seats away from their position of use.

3. A mounting frame as claimed in claim 2, wherein the two mounting seats for the respective filter lenses have interconnecting means for rigidly connecting them together with respect to rotation about an axis of said articulation means.

4. A mounting frame as claimed in claim 1, wherein each said connecting element comprises a tube whose wall is traversed by at least one fixing screw, said tube being engageable on a rod providing said support member, and said at least one fixing screw permitting the locking of said tubes along said rod and permitting the regulation at will of the separation between said mounting seats.

5. A mounting frame for eye glass filters whose filtering properties are distributed asymmetrically over their surface, comprising:
   a) a pair of mounting seats, each comprising a pair of nested annular elements having a channel-shaped cross section;
   b) a filter lens mounted in an inner one of said pair of nested annular elements of each said mounting seat;
   c) manipulating means for angularly orienting each lens in its associated mounting seat, each said manipulating means comprising:
      (i) a slidable detent member extending transversely through the inner annular element and engageable in locating holes formed in the associated outer annular element;
      (ii) biasing means for resiliently urging said detent member into engagement with said locating holes; and
      (iii) gripping means protruding through a slot in the wall of the outer annular member to permit manual disengagement of said detent member against the action of said biasing means;
   wherein each filter lens has a peripheral recess in which are located the said manipulating means.

6. A mounting frame for eyeglass filters whose filtering properties are distributed asymmetrically over their surface, comprising:
   a) a pair of mounting seats, each comprising a pair of nested annular elements having a channel-shaped cross section;
   b) a filter lens mounted in an inner one of said pair of nested annular elements of each said mounting seat;
   c) manipulating means for angularly orienting each lens in its associated mounting seat, each said manipulating means comprising:
      (i) a slidable detent member extending transversely through the inner annular element and engageable in locating holes formed in the associated outer annular element:
      (ii) biasing means for resiliently urging said detent member into engagement with said locating holes; and
      (iii) gripping means protruding through a slot in the wall of the outer annular member to permit manual disengagement of said detent member against the action of said biasing means: wherein, said detent member comprises a rod extending through a molded block located within said inner nested annular element, and said block has a recess formed around said rod accommodating said biasing means.

* * * * *